Aug. 2, 1960   G. A. LYON   2,947,572
WHEEL COVER
Filed March 12, 1957
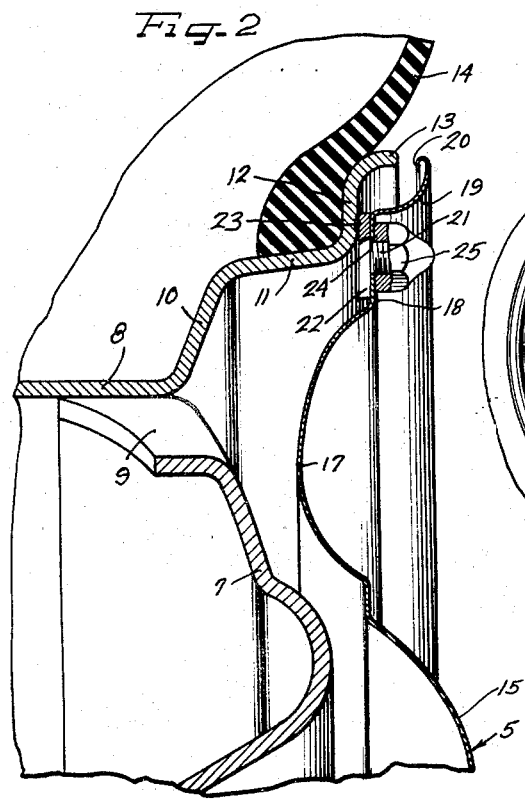
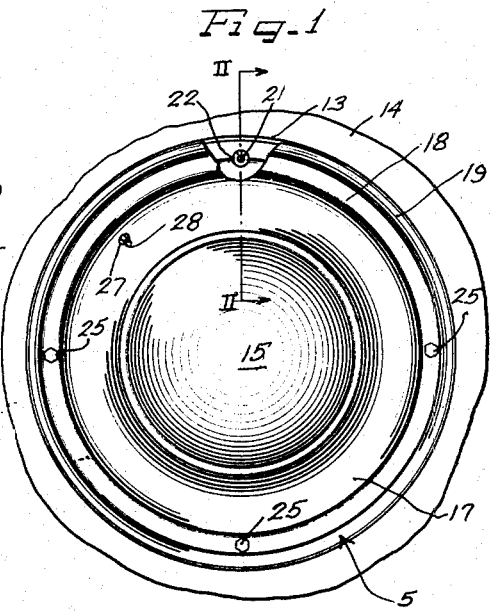
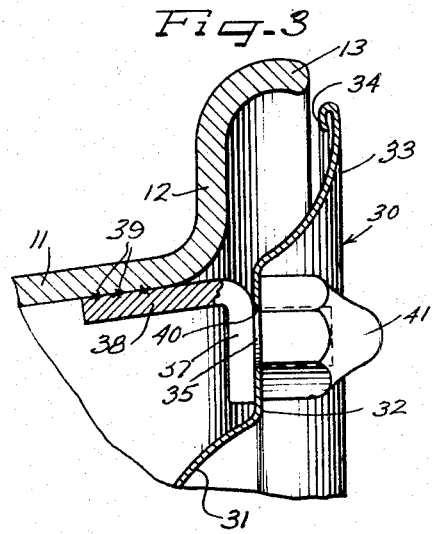
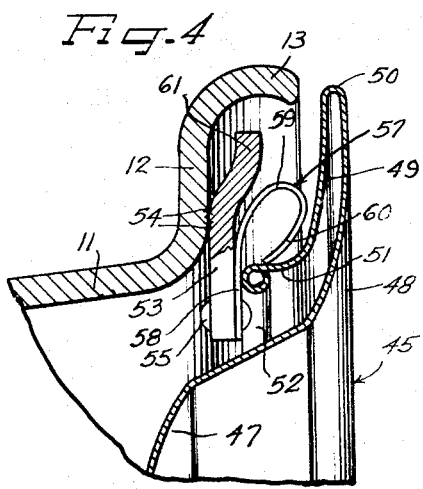
Inventor
GEORGE ALBERT LYON
by
Attys.

United States Patent Office 2,947,572
Patented Aug. 2, 1960

2,947,572

WHEEL COVER

George Albert Lyon, 13881 W. Chicago, Blvd.,
Detroit 28, Mich.

Filed Mar. 12, 1957, Ser. No. 645,507

4 Claims. (Cl. 301—37)

The present invention relates to improvements in wheel structures and more particularly concerns the ornamental and protective covering of the outer sides of vehicle wheels.

There is a growing demand for wheel covers that will entirely cover the outer side of a vehicle wheel inclusive of the terminal flange of the tire rim. This demand is especially developing currently due to the small size of vehicle wheels which have recently been almost throughout the automobile industry reduced from 15" to 14" so as to accommodate larger size low pressure tires.

At the same time, economic pressure is being put upon lower costs, and since wheel covers are made from fairly expensive material reduction in the amount of material used in the covers enables lowering of the cost.

Another factor that is becoming more acute is that of theft of wheel covers, and more especially wheel covers that are adapted for application to wheels of any make of car of a certain size, or a number of model years of any particular make wherein the wheel size has remained constant.

An important object of the present invention is to meet the foregoing and other problems inherent in the provision of covers for disposition at the outer side of vehicle wheels.

Another object of the invention is to provide an improved structure for attaching vehicle wheel covers to the outer sides of the wheels.

A further object of the invention is to provide means for attaching wheel covers enabling a substantial range of predetermined variability in wheel covers of different model years or different models of any given make of car for any given year so as to discourage theft by rendering the covers usable only in the predetermined relationship or on a particular model of automobile or make of automobile.

Still another object of the invention is to provide improved means for mounting wheel covers on the tire rim of a vehicle wheel.

Other objects, features and advantages of the present invention will be readily apparent from the following detailed description of certain preferred embodiments thereof taken in conjunction with the accompanying drawing in which:

Figure 1 is an outer side elevational view of a wheel structure embodying features of the invention;

Figure 2 is an enlarged fragmentary radial sectional detail view taken substantially on the line II—II of Figure 1;

Figure 3 is an enlarged fragmentary radial sectional detail view through a wheel structure showing a modification; and Figure 4 is a radial sectional enlarged detail view through a further modification.

Referring to Figures 1 and 2, a wheel cover 5 is constructed and arranged to be disposed in covering relation to the outer side of a vehicle wheel such as an automobile wheel including a disk spider wheel body 7 peripherally attached fixedly to the base flange 8 of a tire rim, the wheel body providing at juncture with the tire rim a plurality of wheel openings 9 which may be three or four in number. Extending from the base flange 8 and generally radially outwardly is a side flange 10 which merges with a generally axially outwardly and slightly radially outwardly sloping intermediate flange 11. At the axially outer side of the intermediate flange 11 is a terminal flange including a generally radially outwardly extending portion 12 merging with a generally axially outwardly turned lip portion 13. A pneumatic tire 14 is adapted to be supported by the tire rim which is of the multi-flange, drop center type.

In the present instance the cover 5 comprises a full disk, that is, a one piece disk of a diameter to substantially completely cover the outer side of the wheel including the wheel body and the tire rim. To this end the cover 5 comprises a central crown portion 15 which is adapted to overlie the central portion of the wheel body 7. About the crown 15 is an intermediate generally dished cover portion 17 having at the radially outer side thereof a preferably flat radially extending annular flange portion 18 that merges with a marginal annular extremity portion 19 at the radially outer side thereof and which marginal portion extends generally radially and axially outwardly and may be of generally concave convex form, terminating in a turned reinforcing and finishing bead-like edge 20. The marginal portion it will be observed is of such shape as to lie in substantially spaced relation to the terminal flange of the tire rim in the assembly and thus provide a substantial chamber therebehind for reception of wheel balancing weights if necessary, with the turned extremity 20 of the cover lying opposite the tip of the terminal flange portion 13 in spaced relation.

For retaining the cover 5 on the wheel, means are provided on the tire rim and in this instance on the terminal flange thereof for retaining engagement with the cover. To this end, the terminal flange portion 12 is provided with a plurality of studs 21 that project axially outwardly and have enlarged base flange portions 22 which are secured as by welding 23 to the radially inner portion of the terminal flange section or portion 12 in such relation as to provide a clear space between the radially outer side of the base 22 and the terminal flange lip portion 13 so as to freely accommodate wheel balancing weights. In the present instance, there are four of the studs 21 but it will be clear that there may be three of such studs or there may be five, depending on preference, weight of cover and the like.

The cover retaining studs 21 are disposed to be received through respective apertures 24 provided in the cover portion 18.

In applying the cover to the outer side of the wheel, the respective stud apertures 24 are registered with and the studs 21 projected therethrough and then cap nuts 25 are applied to the studs 21 which are threaded for this purpose and the cap nuts tightened down to secure the annular cover portion 18 against axially outer side cover receiving surfaces of the stud bases 22. It will be observed that the major portions of the stud bases 22 extend radially inwardly beyond the terminal flange portion 12 and into overlying relation to the intermediate flange 11. By virtue of the spacing provided by the stud bases 22 between the cover portion 18 and the underlying portion of the tire rim, a gap is provided through which water and dirt can escape from behind the cover should this be necessary. All of the cover 5 is supported in spaced relation to the wheel inclusive of the wheel body and the tire rim. It is a simple matter to remove the cover from the outer side of the wheel by removing the cap nuts 25.

A valve stem aperture 27 is provided in the dished cover portion 17 and is disposed to register with a valve stem 28. It will be obvious that the studs 21 hold the cover firmly against turning on the wheel.

In the form of Figure 3, the wheel may be of substantially the same structure as in Figure 2 and similar reference numerals apply to identical parts of the wheel and especially the tire rim of which a portion is shown. In this instance, a wheel cover 30 which may in general respects be similar to the wheel cover 5 is provided, among other things, with an intermediate dished portion 31, a radially outwardly extending annular flat flange portion 32 and a radially outer arched marginal portion 33 adapted to overlie the tire rim terminal flange portions 12 and 13 and provide therewith a chamber within which wheel balancing weights are adapted to be received. An underturned bead-like reinforcing and finishing flange extremity portion 34 is provided on the marginal portion 33 which is adapted to lie in spaced or gap relation to the tip of the terminal flange lip 13 in the assembly.

For retaining the cover 30 on the wheel, a plurality of studs 35 are provided which, similarly as the studs 21 may be in any preferred number from three to five, for example, and disposed in circumferentially spaced relation on the tire rim, being provided with integral base portions 37 having generally axially inwardly extending rim engaging flange portions 38 which are secured as by welding at 39 to the axially outer side of the intermediate tire rim flange 11. The base portions 37 are preferably disposed in a plane which will support the cover 30 in the preferred spaced relation to the wheel when the flat flange portion 32 of the cover is resting against the axially outer cover receiving faces of the base portions 37, with the studs 35 extending through appropriate apertures 40 in the wheel flange 32. Cap nuts 41 screwed onto the studs 35 fasten the cover in place by clamping the flange portion 32 against the base portions 37 of the stud members. Through this arrangement the terminal flange is left entirely clear.

In the form of Figure 4, again, the vehicle wheel may be substantially the same as in Figure 2 and therefore similar reference numerals are applicable to the identical parts, especially the portion of the tire rim that is shown in Figure 4. In this instance, a wheel cover 45 is applied in press-on, pry-off relation at the outer side of the wheel and includes an intermediate dished portion 47 merging with a generally radially extending marginal portion 48 having therebehind an underturned generally radially inwardly extending annular reinforcing flange 49 joining the marginal portion 48 on a reinforcing and finishing juncture 50 which is of a diameter to lie in assembly opposite the tip of the terminal flange lip 13 in spaced relation.

For retaining the cover 45 on the wheel, the underturned flange 49 is provided with an axially inwardly extending annular flange extension 51 of limited width provided with an inturned reinforcing and stiffening bead 52. Means are provided on the terminal flange herein comprising a plurality which may be three or more in number of base bracket members 53 secured as by welding 54 to the radially inner portion of the terminal flange portion 12 and projecting radially inwardly therebeyond into overlying relation to the intermediate flange 11. Secured to the bracket 53 in each instance, as by means of a rivet 55 is a cover retaining spring clip 57 having a base portion 58 resting against the bracket or base 53 and secured thereto by the rivet 55. At the radially outer end portion of the clip base 58 is a return-bent spring loop 59 having a generally radially and axially inwardly extending terminal portion 60 provided with a sharp tip that is engageable bitingly with the radially outer side of the stiff cover flange 51. It will be appreciated that the diameter to which the tips of the terminal clip portion 60 extend normally is slightly less than the diameter of the outer surface of the cover flange 51 so that in applying the cover to the outer side of the wheel, the bead 52 is cammed inwardly along the clip loop or head leg or terminal portion 60 until the tip of such leg or terminal portion of the clip snaps over and into engagement with the face of the cover flange 51.

In the fully assembled relationship it will be appreciated that the cover 45 by resting against the base or cover receiving surface provided by the clip portion 58 at the bead 52 is held in spaced relation to the outer side of the wheel and in gap relation to the tire rim for free movement of dirt from under the cover outwardly in the movement of the wheel or while the wheel is standing. In order to avoid possible misapplication of the cover to the outer side of the wheel by insertion of the bead 52 at the radially outer side of the clip loop 59, a guard extension 61 may be provided on the radially outer side of the bracket base portion 53 and turned generally axially outwardly and then radially outwardly to provide not only a stop against engagement of the bead 52 behind the clip loop 59 but also preventing movement of the bead 52 into engagement with the terminal flange portion 12.

An advantage of the bracket structure 53 is that the clip 57 can be riveted thereto while the bracket base member is welded to the tire rim so that no holes need be made in the tire rim. Since the retaining springs 57 are of hard spring steel welding destroys the temper and it is advisable to rivet the same rather than weld the same in place.

It will be appreciated that any of the wheel covers 5, 30 or 45 can be readily constructed from sheet metal such as steel sheet or strip, stainless steel, brass, aluminum, or the like stamped or drawn to form. In fact, by introducing between the retaining nuts and the underlying or clamped portion of the cover suitable washer or plate means the construction in especially Figures 2 and 3 may readily be adapted for a moldable plastic type of cover.

With any form of the structures shown, it will be apparent that a large variety of special relationships between the cover and the retaining means can be effected so as to provide for exclusive application of certain wheel covers to certain wheels. For example, the circumferential relationship of the retaining studs in Figures 1, 2 and 3 with respect to the valve stem aperture, the number of retaining studs, the radial relative disposition of the studs on the tire rim with correlated modification in the cover and combinations thereof will enable producing such exclusiveness in the covers. In the form of Figure 4, of course, numerous variations can be effected as to diameter of the retaining flange 51 and the corresponding disposition of the retaining clips 57 to enable a substantial range of exclusiveness for the covers of different year models or makes of automobile. Hence, transfer of covers from one model to the other or from one make of automobile to another is rendered impossible throughout a wide range and thus theft of covers while not precluded is strongly discouraged by the lack of interchangeability and extremely limited applicability of the covers.

It will be understood that modifications and variations may be effected without departing from the scope of the novel concepts of the present invention.

I claim as my invention:

1. In a wheel structure including a wheel body supported by a tire rim having a generally axially outwardly extending intermediate flange joining a generally radially outwardly and then axially outwardly extending terminal flange, a plurality of rigid cover supporting members secured to the tire rim adjacent to juncture of the intermediate and terminal flanges and disposed in circumferentially spaced relation, each of said members including a base flange portion projecting radially inwardly beyond said juncture in generally overlying relation to the intermediate flange and having a cover receiving surface spaced substantially axially outwardly relative to the radially extending portion of the terminal flange, the surfaces being disposed coplanar, said surfaces having cover engaging and retaining means projecting generally axially outwardly therefrom, and a cover of a diameter to substantially overlie the terminal flange with the radially outer extremity located adjacent to the tip of the axially extending portion of the terminal flange and with an annular portion of the cover spaced radially and axially inwardly from the cover extremity retainingly engageable by said cover retaining means for thereby holding the cover concentric with the wheel and with said annular cover portion firmly drawn toward said surface, the cover being entirely supported by said members and by virtue of the relationship of said members to the tire rim and the spaced relation of said surfaces from the tire rim supporting the cover in entirely spaced relation to the tire rim inclusive of said extremity and the tip of the terminal flange and thereby affording a gap relation between the cover and the tire rim through which water and dirt can escape from behind the cover.

2. A wheel structure as defined in claim 1, wherein said rigid supporting members are secured onto the radially extending terminal flange portion and project radially inwardly substantially beyond the intermediate flange, said cover engaging means comprising in each instance an axially outwardly extending rigid threaded stud and a nut threadedly engageable with the stud to clamp a portion of the cover against the cover receiving surface of the supporting member.

3. A wheel structure as defined in claim 1, wherein said rigid supporting members are welded onto the radially extending portion of the terminal flange and have radially inwardly projecting respective portions having riveted thereto cover retaining clips provided with generally radially outwardly and then return-bent spring loops with generally radially and axially inwardly projecting respective terminals, the cover having a marginal flange therebehind projecting generally axially inwardly and engageable bitingly by the terminals of the spring loops, said supporting members having generally radially outwardly projecting guard extensions providing stops against engagement of the cover flange behind the clip loops and to prevent movement of the edge of the cover flange into engagement with the radially extending terminal flange portion.

4. A wheel structure as defined in claim 1 wherein said rigid supporting members are of generally L-shape having a generally axially inwardly extending leg welded onto the axially outer portion of the intermediate flange and a generally radially inwardly projecting leg extending from the axially outer end of the axially inwardly extending leg and providing the receiving surface for the cover.

References Cited in the file of this patent

UNITED STATES PATENTS

| | | |
|---|---|---|
| 2,076,789 | Le Jeune | Apr. 13, 1937 |
| 2,181,364 | Burger | Nov. 28, 1939 |
| 2,239,367 | Lyon | Apr. 22, 1941 |
| 2,621,978 | Lyon | Dec. 16, 1952 |

FOREIGN PATENTS

| | | |
|---|---|---|
| 256,843 | Italy | Jan. 21, 1928 |
| 473,203 | Great Britain | Oct. 8, 1937 |
| 523,105 | Canada | Mar. 27, 1956 |